(12) United States Patent
Horiuchi et al.

(10) Patent No.: US 7,359,981 B2
(45) Date of Patent: Apr. 15, 2008

(54) VIDEO PROXY SERVER

(75) Inventors: Masaki Horiuchi, Katano (JP); Hideaki Harumoto, Moriguchi (JP)

(73) Assignee: Matsushita Electric Industrial Co., Ltd., Osaka-Fu (JP)

( * ) Notice: Subject to any disclaimer, the term of this patent is extended or adjusted under 35 U.S.C. 154(b) by 0 days.

(21) Appl. No.: 11/481,066

(22) Filed: Jul. 6, 2006

(65) Prior Publication Data

US 2006/0253602 A1   Nov. 9, 2006

Related U.S. Application Data

(62) Division of application No. 10/140,887, filed on May 9, 2002, now Pat. No. 7,099,953.

(30) Foreign Application Priority Data

May 10, 2001 (JP) .............................. 2001-140365

(51) Int. Cl.
*G06F 15/16* (2006.01)

(52) U.S. Cl. ...................... 709/231; 709/232; 709/233; 725/86; 725/87

(58) Field of Classification Search ................ 709/217, 709/230, 231–233; 725/86, 87, 100–105; 380/210, 212, 215
See application file for complete search history.

(56) References Cited

U.S. PATENT DOCUMENTS

| | | | |
|---|---|---|---|
| 5,414,455 A | 5/1995 | Hooper et al. | |
| 5,583,561 A | 12/1996 | Baker et al. | |
| 5,864,682 A | 1/1999 | Porter et al. | |
| 5,933,603 A | 8/1999 | Vahalia et al. | |
| 6,014,706 A * | 1/2000 | Cannon et al. | ............. 709/231 |
| 6,173,317 B1 | 1/2001 | Chaddha et al. | |
| 6,175,862 B1 | 1/2001 | Chen et al. | |
| 6,185,625 B1 | 2/2001 | Tso et al. | |
| 6,314,466 B1 | 11/2001 | Agarwal et al. | |
| 6,405,256 B1 | 6/2002 | Lin et al. | |
| 6,408,338 B1 | 6/2002 | Moon et al. | |
| 6,535,920 B1 | 3/2003 | Parry et al. | |
| 6,542,967 B1 | 4/2003 | Major | |
| 6,571,391 B1 | 5/2003 | Acharya et al. | |

(Continued)

FOREIGN PATENT DOCUMENTS

JP  9-81491  3/1997

*Primary Examiner*—Saleh Najjar
*Assistant Examiner*—Faruk Hamza
(74) *Attorney, Agent, or Firm*—Wenderoth, Lind & Ponack, L.L.P.

(57) ABSTRACT

A video proxy server capable of streaming video data after a seek position in quick response to a request from a terminal while caching the video data without any loss. When the video proxy server receives a seek playback request while executing a video reading and caching operation of receiving video data from a content server, caching the video data, and streaming the cached video data to a terminal, the video proxy server starts receiving video data after the seek position from the content server, caching the video data after the seek position, and streaming the video data after the seek position to the terminal while continuing to receive and cache the video data so as to prevent any loss of the video data as the video data after the seek position is concurrently received, cached and streamed to the terminal.

6 Claims, 13 Drawing Sheets

U.S. PATENT DOCUMENTS

| | | |
|---|---|---|
| 6,708,213 B1 | 3/2004 | Bommaiah et al. |
| 6,721,490 B1 | 4/2004 | Yao et al. |
| 6,865,747 B1 * | 3/2005 | Mercier .................. 725/94 |
| 6,907,570 B2 | 6/2005 | Amir et al. |
| 6,970,640 B2 * | 11/2005 | Green et al. ............. 386/68 |
| 7,003,795 B2 | 2/2006 | Allen |
| 7,028,096 B1 | 4/2006 | Lee |
| 7,058,721 B1 * | 6/2006 | Ellison et al. ........... 709/231 |
| 7,096,271 B1 * | 8/2006 | Omoigui et al. ......... 709/231 |
| 7,237,254 B1 * | 6/2007 | Omoigui .................. 725/94 |

* cited by examiner

VIDEO PROXY SERVER

This application is a divisional of U.S. application Ser. No. 10/140,887, filed May 9, 2002 now U.S. Pat. No. 7,099,953.

BACKGROUND OF THE INVENTION

1. Field of the Invention

The present invention relates to video proxy servers and, more specifically, to a video proxy server provided between a content server and a terminal, for receiving video data from the content server, caching the video data, and then streaming the video data to the terminal for playback.

2. Description of the Background Art

In recent years, significant improvements in computer performance have boosted video distribution services through the Internet for business and amusement purposes. Such video distribution services often use a technology called streaming. In video distribution with streaming, video data is stored in a server. In response to a playback request from a terminal, the server distributes requested video data to the terminal. In this case, it takes time for the terminal to receive the requested video data after transmitting the request. Such a response time lag between transmission of the request and the start of reproducing the requested video data should be reduced.

Conventionally, to reduce the response time, a scheme of providing a device called a proxy server between a server and terminals has been suggested. The proxy server is placed in the vicinity of the terminals in order to quickly respond to a request therefrom, and caches (stores) video data coming from the server for streaming to the terminals. Then, when any terminal requests the same video data as that which was previously cached in the proxy server, the cached video data is streamed to the requesting terminal, thereby achieving a reduction in response time.

FIG. 14 is a block diagram illustrating an example configuration of a system using a conventional video proxy server. This system is constructed on a network by original video data 10 stored in a server or others on the network, a video proxy server 12 for caching the video data 10, and a terminal 11 connected to the video proxy server 12 for receiving the video data 10. In FIG. 14, only one terminal 11 is illustrated, but a plurality of terminals may be provided. The operation of the conventional video proxy server 12 is described in further detail below with reference to FIG. 14.

In FIG. 14, the video proxy server 12 includes a cache 14 for storing the video data 10 and a cache controller 13 for controlling the cache 14. The cache controller 13 causes the cache 14 to cache the original video data 10 based on a playback start request coming from the terminal 11.

In this conventional art, the original video data 10 requested by the terminal 11 is streaming there to while being cached by the video proxy server 12. Then, when the terminal 11 again requests the same video data as the original video data 10, the video proxy server 12 streams the cached video data to the terminal 11. This enables a reduction in the amount of time that is taken to respond to a playback request, as compared with a case where the original video data 10 is streaming from the server. Such a configuration is disclosed, for example, in Japanese Patent Laid-Open Publication No. 9-81491 (1997-81491).

However, the conventional video proxy server 12 has a drawback. Consider a case where the video proxy server 12 receives a seek playback request (request for changing a data position for playback) for seeking a position of data not yet cached while reading the original video data 10 from the server upon request from the terminal 11, caching the video data, and streaming the video data to the terminal 11. In this case, for streaming to the terminal 11, the video proxy server 12 has to wait until video data after a requested position (hereinafter, seek position) is cached. This causes an increase in response time in proportion to a distance (time difference) between the seek position requested by the terminal 11 and a current playback position.

For eliminating such an increase in response time, the position to be read in the original video data 10 should be quickly changed to the requested seek position. Then, the video data after the seek position is streaming to the terminal 11 while being cached. In this case, however, the video data cached in the video proxy server 12 may miss some data (i.e., become discontinuous in time), and therefore is not reusable and, as a result, becomes wasted.

Moreover, there is another drawback. In the conventional video proxy server 12, a cache speed of reading the original video data 10 from the server for caching is predetermined. Therefore, if the plurality of terminals 11 set different playback speeds or change their playback speeds during playback, those playback speeds cannot exceed the predetermined cache speed.

SUMMARY OF THE INVENTION

Therefore, an object of the present invention is to provide a video proxy server which is capable of streaming video data after a seek position in quick response to a request from a terminal while caching the video data without any loss.

Another object of the present invention is to provide a video proxy server which is capable of streaming video data to each terminal at a speed corresponding to each desired playback speed.

The present invention has the following features to attain the objects mentioned above.

A first aspect of the present invention is directed to a video proxy server, which is provided between a content server storing video data and a terminal capable of video playback, for receiving the video data from the content server, caching the video data, and streaming the video data to the terminal for playback. The video proxy server includes: a request receiving section for receiving a request from the terminal; a video receiving section for receiving the video data from the content server based on the request from the terminal; a video cache section for caching the video data received by the video receiving section; and a video streaming section for streaming the video data cached by the video cache section to the terminal.

When the request receiving section receives a playback request, the video receiving section starts a video receiving operation of receiving the video data from the content server. When the request receiving section receives a seek playback request while the video receiving section is executing the video receiving operation, the video receiving section starts receiving video data after a seek position from the content server while continuing the video receiving operation.

The video cache section includes a cache area for caching the video data received by the video receiving section from the content server, and a temporary cache area for temporarily caching the video data after the seek position received by the video receiving section from the content server.

In the first aspect (or the following twelfth and thirteenth aspects), when a seek playback request is issued from the terminal to which the video data received from the content server and cached in the cache area is streaming, an operation of receiving the video data after the seek position from the content server is newly started. At this time, the operation of receiving the video data from the content server and caching the video data in the cache area is not stopped but continued.

That is, when the terminal does a seek during video playback, the video proxy server concurrently executes the operation of receiving and caching the video data and the operation of receiving the video data after the seek position and temporarily caching the video data after the seek position. Thus, it is possible to cache the video data without any loss even with seek playback at the terminal.

The cache area and the temporary cache area are implemented by one piece of RAM in the preferred embodiments. Alternatively, these areas may be implemented by two or more pieces of RAM, or may be implemented by a storage medium other than RAM which is capable of quick reading and writing.

In the second aspect, in accordance with the first aspect, when the request receiving section receives the playback request, the video streaming section starts reading the video data from the cache area and streaming the video data to the terminal. Furthermore, when the request receiving section receives the seek playback request while the video receiving section is receiving the video data from the content server, the video streaming section stops reading the video data from the cache area and streaming the read video data to the terminal, and starts reading the video data cached in the temporary cache area and streaming the read video data to the terminal.

In the second aspect, when a seek playback request is issued from the terminal to which the video data received from the content server and cached in the cache area is being streamed, an operation of receiving video data after the seek position from the content server, caching the video data after the seek position in the temporary cache area, and streaming the video data after the seek position to the terminal is newly started. At this time, the operation of receiving the video data from the content server and caching the video data in the cache area is not stopped but continued. Only the operation of streaming the video cached in the cache area is stopped.

That is, when the terminal does a seek during video playback, the video proxy server concurrently executes the operation of receiving and caching the video data, and the operation of receiving the video data after the seek position and temporarily caching the video data after the seek position. Thus, it is possible to stream the video data after the seek position in quick response to the request from the terminal, while caching the video data without any loss even with seek playback at the terminal.

According to a third aspect, in accordance with the first aspect, when the request receiving section receives a stop request while the video receiving section is receiving the video data after the seek position from the content server in response to the seek playback request, the video cache section clears the temporary cache area.

In the third aspect, it is possible to quickly respond to the next seek playback request.

According to a fourth aspect, in accordance with the first aspect, when the request receiving section receives a next seek playback request while the video receiving section is receiving the video data after the seek position from the content server in response to the seek playback request, the video cache section clears the temporary cache area, and then starts caching the video data after a next seek position in the temporary cache area.

In the fourth aspect, it is possible to quickly respond to incoming seek playback requests by using the limited temporary cache area.

According to a fifth aspect, in accordance with the first aspect, the video receiving section receives the video data or the video data after the seek position based on the request from the terminal only when the requested video data or the requested video data after the seek position has not been cached by the video cache section.

In the fifth aspect, when the requested video data or the requested video data after the seek position has been cached in the video cache section, the operation of receiving the video data from the content server is not required. Therefore, it is possible to reduce the amount of time that is taken to start streaming after the request is received, and also save a band of the network.

A sixth aspect of the present invention is directed to a video proxy server, which is provided between a content server storing video data and a plurality of terminals capable of video playback at playback speeds that are different from each other, for receiving the video data from the content server, caching the video data, and streaming the video data to the terminals for playback. The video proxy server includes: a speed managing section for managing the playback speeds of the terminals; a video receiving section for receiving the video data from the content server; a video cache section for caching the video data received by the video receiving section; and a video streaming section for streaming the video data cached by the video cache section to the terminals at speeds corresponding to the respective playback speeds of the terminals.

The video receiving section receives the video data from the content server at a speed Vmax corresponding to a speed that is the highest of the playback speeds of the terminals managed by the speed managing section.

In the sixth aspect (or the following fourteenth and fifteenth aspects), the playback speeds of the terminals are managed, and video data is received from the content server at a speed corresponding to the one that is the highest of the playback speed of the terminals, cached, and streamed to the terminals. Thus, it is possible to stream video data at a speed corresponding to the playback speed of each terminal.

According to a seventh aspect, in accordance with the sixth aspect, the video proxy server further includes a request receiving section for receiving a request from each of the terminals. When the request receiving section receives a speed-change request for changing the speed Vmax at which the video data is being received from the content server to a speed V, the video receiving section compares the speed V with the speed Vmax and, when the speed V>the speed Vmax, moves to an operation of receiving the video data from the content server at the speed V.

According to an eighth aspect, in accordance with the seventh aspect, when the speed V<the speed Vmax, the video receiving section continues receiving the video data from the content server at the speed Vmax.

In the above seventh and eighth aspects, when any of the terminals changes the playback speed to the speed V, the speed V is compared with the highest speed Vmax before the change. If the speed V>the speed Vmax, the speed of video reception from the content server is changed from Vmax to V. On the other hand, if the speed V<the speed Vmax, the speed is maintained at Vmax. Thus, it is possible to stream video data at a speed corresponding to the playback speed of each terminal.

According to a ninth aspect, in accordance with the sixth aspect, the video proxy server further includes a request receiving section for receiving a request from each of the terminals. When the request receiving section receives a stop request while the video receiving section is receiving the video data from the content server at the speed Vmax, the video receiving section moves to an operation of receiving the video data from the content server at a speed V'max corresponding to a speed that is the highest of the playback speeds, managed by the speed managing section, of the terminals except for the terminal that made the stop request.

In the ninth aspect, when any of the terminals is stopped, the speed of video reception from the content server becomes the one that corresponds to the highest one of the playback speeds of the remaining terminals. That is, when the highest terminal is stopped, the speed of video reception from the content server is changed to the speed V'max corresponding to the playback speed of the second highest terminal. When the terminal other than the highest one is stopped, the receiving speed is maintained at the speed Vmax. Thus, it is possible to stream video data at a speed corresponding to the playback speed of each terminal irrespectively of which terminal is stopped.

According to a tenth aspect, in accordance with the sixth aspect, the video proxy server further includes a request receiving section for receiving a request from each of the terminals. When the request receiving section receives a stop request while the video receiving section is receiving the video data from the content server at the speed Vmax, the video receiving section compares a speed V'max corresponding to a speed that is the highest of the playback speeds, managed by the speed managing section, of the terminals except for the terminal that made the stop request with a predetermined speed Vdef, and when the speed V'max>the speed Vdef, the video receiving section moves to an operation of receiving the video data from the content server at the speed V'max According to an eleventh aspect, in accordance with the tenth aspect, when the speed V'max<the speed Vdef, the video receiving section moves to an operation of receiving the video data from the content server at the speed Vdef.

In the tenth and eleventh aspects, even if the playback speed of any of the terminals becomes extremely low, the speed of video reception from the content server is maintained at the speed Vdef or higher for caching. Therefore, it is possible to respond to a sudden seek at any of the terminals.

A twelfth aspect of the present invention is directed to a video streaming method which is carried out between a content server storing video data and a terminal capable of video playback, for receiving the video data from the content server, caching the video data, and streaming the video data to the terminal for playback. The method includes the steps of: receiving a request from the terminal; receiving the video data from the content server based on the request from the terminal; caching the video data received in the video receiving step; and streaming the video data cached in the video caching step to the terminal.

In the video receiving step, when a playback request is received in the request receiving step, a video receiving operation of receiving the video data from the content server is started, when a seek playback request is received in the request receiving step while the video receiving operation is being executed, an operation of receiving video data after a seek position from the content server is started while the video receiving operation is being continued.

In the video caching step, when the playback request is received in the request receiving step, a video caching operation of caching the video data received in video receiving step from the content server is started, and when the playback request is received in the request receiving step while the operation of receiving the video data from the content server is being executed, an operation of temporarily caching the video data after the seek position received in video receiving step from the content server while the video caching operation is being executed is continued.

A thirteenth aspect of the present invention is directed to a computer-readable medium having a program stored thereon that describes a video streaming method which is carried out between a content server storing video data and a terminal capable of video playback, for receiving the video data from the content server, caching the video data, and streaming the video data to the terminal for playback. The method includes the steps of: receiving a request from the terminal; receiving the video data from the content server based on the request from the terminal; caching the video data received in the video receiving step; and streaming the video data cached in the video caching step to the terminal.

In the video receiving step, when a playback request is received in the request receiving step, a video receiving operation of receiving the video data from the content server is started, when a seek playback request is received in the request receiving step while the video receiving operation is being executed, an operation of receiving video data after a seek position from the content server is started while the video receiving operation is being continued.

In the video caching step, when the playback request is received in the request receiving step, a video caching operation of caching the video data received in video receiving step from the content server is started, and when the playback request is received in the request receiving step while the operation of receiving the video data from the content server is being executed, an operation of temporarily caching the video data after the seek position received in video receiving step from the content server while the video caching operation is being executed is continued.

A fourteenth aspect of the present invention is directed to a video streaming method which is carried out between a content server storing video data and a plurality terminals capable of video playback at playback speeds that are different from each other, for receiving the video data from the content server, caching the video data, and streaming the video data to the terminals for playback. The method includes the steps of: managing the playback speeds of the terminals; receiving the video data from the content server; caching the video data received in the video receiving step; and streaming the video data cached by the video caching step to the terminal at speeds corresponding to the respective playback speeds of the terminals.

In the video receiving step, the video data is received from the content server at a speed Vmax corresponding to a speed that is the highest of the playback speeds of the terminals managed in the speed managing step.

A fifteenth aspect of the present invention is directed to a computer-readable medium having a program stored thereon that describes a video streaming method which is carried out between a content server storing video data and a plurality terminals capable of video playback at playback speeds differed from each other, for receiving the video data from the content server, caching the video data, and streaming the video data to the terminals for playback. The method includes the steps of: managing the playback speeds of the terminals; receiving the video data from the content server; caching the video data received in the video receiving step; and streaming the video data cached by the video caching step to the terminals at speeds corresponding to the respective playback speeds of the terminals.

In the video receiving step, the video data is received from the content server at a speed Vmax corresponding to a speed that is the highest of the playback speeds of the terminals managed in the speed managing step.

These and other objects, features, aspects and advantages of the present invention will become more apparent from the following detailed description of the present invention when taken in conjunction with the accompanying drawings.

DETAILED DESCRIPTION OF THE PREFERRED EMBODIMENTS

With reference to the drawings, described below are embodiments of the present invention.

First Embodiment

Figure 1:
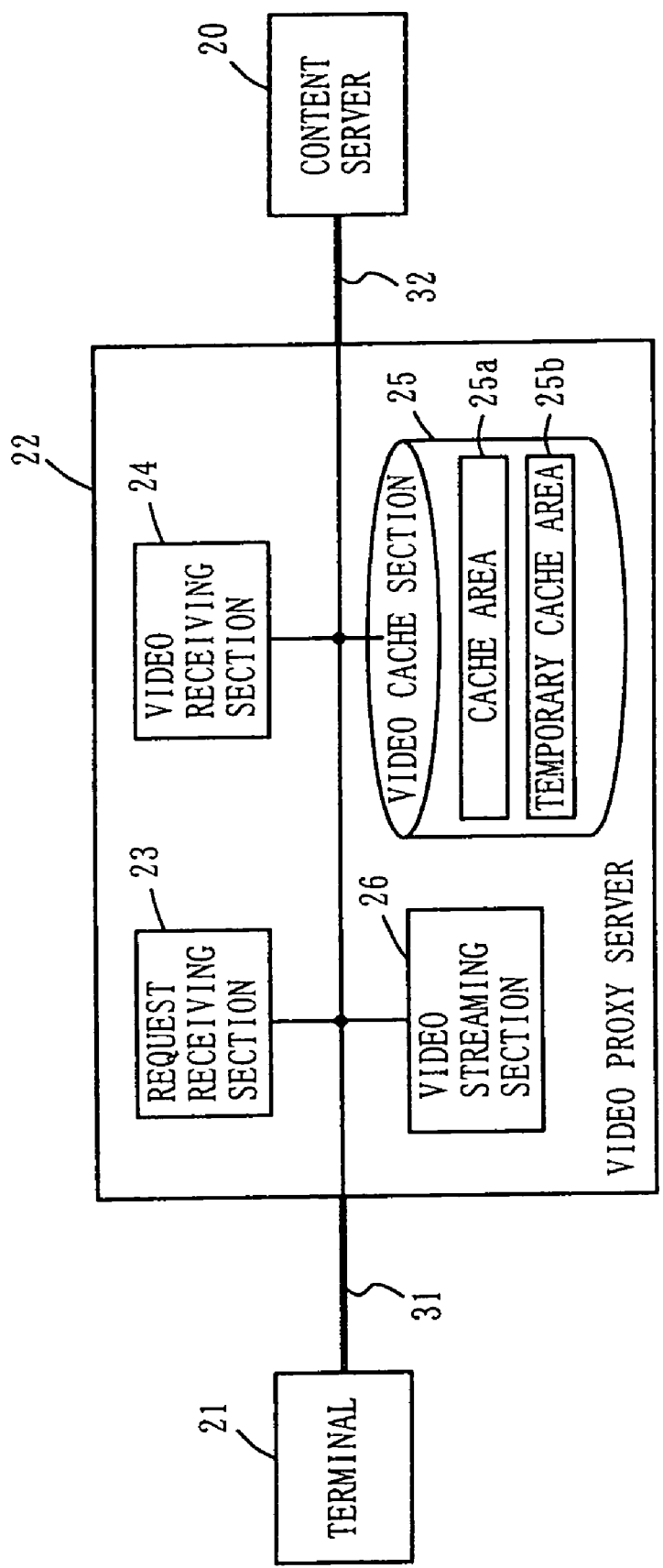
FIG. 1 is a block diagram illustrating the configuration of a video streaming system using a video proxy server according to a first embodiment of the present invention.

FIG. 1 is a block diagram illustrating the configuration of a video streaming system using a video proxy server according to a first embodiment of the present invention. In FIG. 1, the video streaming system includes a content server 20, a terminal 21, and a video proxy server 22 according to the present embodiment. The terminal 21 is connected to the video proxy server 22 via a network 31. The video proxy server 22 is connected to the content server 20 via a network 32.

The content server 20 stores video data. The terminal 21 reproduces video data streaming thereto. The video proxy server 22 is provided between the content server 20 and the terminal 21, receives video data from the content server 20, caches the received video data, and streams the video data to the terminal 21.

The video proxy server 22 includes a request receiving section 23, a video receiving section 24, a video cache section 25, and a video streaming section 26.

The request receiving section 23 receives a request from the terminal 21. The video receiving section 24 receives video data from the content server 20 based on the request from the terminal 21. The video cache section 25 caches the video data received by the video receiving section 24. The video streaming section 26 streams the video data cached by the video cache section 25 to the terminal 21.

Here, the video data stored in the content server 20 is digital video data, such as movies, live concerts and sports. The content server 20 has a function of sending out, in response to a request from the terminal 21, video data as a stream. The video data sent out from the content server 20 is streaming through the networks 31 and 32 to the terminal 21, which reproduces the streaming video data on a real-time basis.

The terminal 21 can carry out two types of playback. One is normal playback of successively reproducing video data from its head position. The other is seek playback of starting playback from a position (seek position) other than the head position. For normal playback, the terminal 21 issues a playback request, and the content server 20 sends out the requested video data from its head position. For seek playback, the terminal 21 issues a seek playback, and the content server 20 sends out the requested video data from the seek position. To make playback stop, the terminal 21 issues a stop request, and the content server 20 stops sending out the video data.

The video cache section 25 includes a cache area 25a for caching the video data received by the video receiving section 24 from the content server 20, and a temporary cache area 25b for temporarily caching the video data after the seek position received by the video receiving section 24 from the content server 20.

The video receiving section 24 receives the video data or the video data after the seek position based on the request from the terminal 21, from the video cache section 25 if cached, or from the content server 20 if not cached. This enables reduction in the amount of time that is taken to start streaming after the request is received, and also can save load on the bandwith of the network 32.

In other words, when receiving a playback request, the video receiving section 24 determines whether the requested video data has been cached in the video cache section 25. If the requested video data has not yet been cached in the video cache section 25, the video receiving section 24 starts a video receiving operation of receiving the video data from the content server 20. During the video receiving operation, when the request receiving section 23 receives a seek playback request, the video receiving section 24 starts an operation of temporarily receiving the video data from the seek position from the content server 20 while continuing the video receiving operation.

When the request receiving section 23 receives a playback request, the video streaming section 26 starts reading the requested video data from the cache area 25a for streaming to the terminal 21. Then, when the request receiving section 23 receives a seek playback request while the video receiving section 24 is carrying out the video receiving operation of receiving the video data from the content server 20, the video streaming section 26 stops reading the requested video data from the cache area 25a for streaming to the terminal

21, and starts reading the requested video data from the temporary cache area 25*b* for streaming to the terminal 21.

In other words, when a seek playback request is issued from the terminal 21 while the video data is being received from the content server 20, being cached in the cache area 25*a*, and being streaming to the terminal 21, the video proxy server 22 starts receiving the video data after the seek position from the content server 20, caches the video data after the seek position in the temporary cache area 25*b*, and streams the video data after the seek position to the terminal 21. At this time, the video proxy server 22 continues receiving the video data from the content server 20 and caches the video data in the cache area 25*a*, but stops streaming the video data cached in the cache area 25*a* to the terminal 21.

That is, when the terminal 21 does a seek during video playback, the video proxy server 22 concurrently carries out the operation of receiving the video data and caching the video data, and the operation of receiving the video data after the seek position, temporarily caching the video data after the seek position, and streaming the video data after the seek position to the terminal 21. This enables a quick response to the seek playback request from the terminal 21, and also enables continuous playback of the video data being cached.

Furthermore, when the request receiving section 23 receives a next playback request while the video receiving section 24 is receiving the video data after the seek position from the content server 20 in response to the seek playback request, the video cache section 25 clears the temporary cache area 25*b*, and then starts an operation of caching the video data after the subsequent seek position in the temporary cache area 25*b*. This enables a quick response to incoming seek playback requests by using the limited temporary cache area 25*b*.

Figure 2:
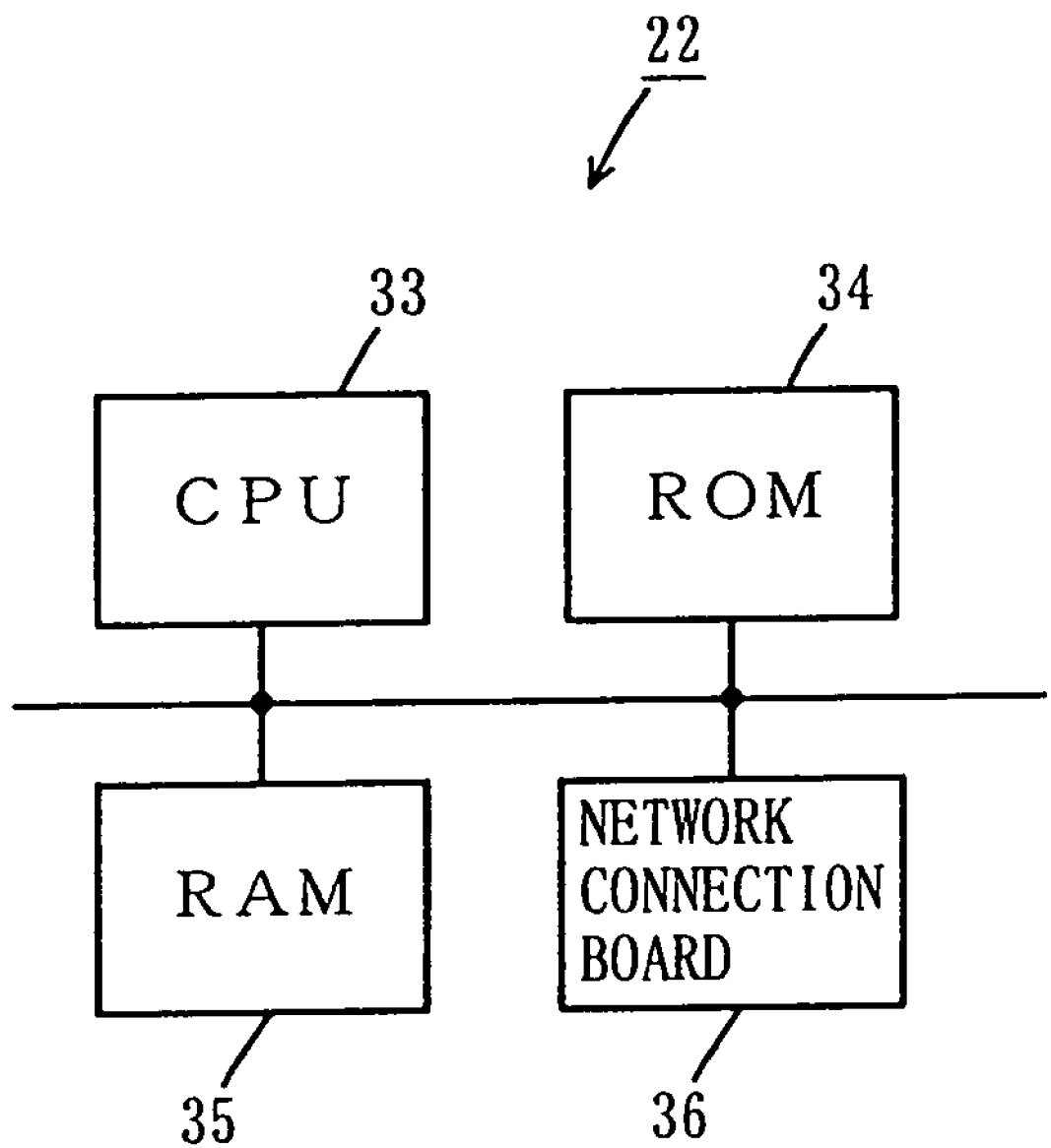
FIG. 2 is a block diagram illustrating an example hardware structure of the video proxy server according to the first embodiment of the present invention.

FIG. 2 is a block diagram illustrating an example hardware structure of the video proxy server 22 according to the present invention. In FIG. 2, the video proxy server 22 includes a CPU 33, ROM 34, RAM 35, and a network connection board 36. The network connection board 36 connects the video proxy server 22 and the networks 31 and 32 together. The ROM 34 stores a predetermined program. When the CPU 33 executes the program stored in the ROM 34 while using the RAM 35 as a working area, the above-described operations are carried out by the components (23 to 26) of the video streaming system of the first embodiment. Although the program is previously stored in the ROM 34 in the present embodiment, the program may be provided as being stored in a portable recording medium such as CD-ROM, or may be supplied via a network.

Figure 3:
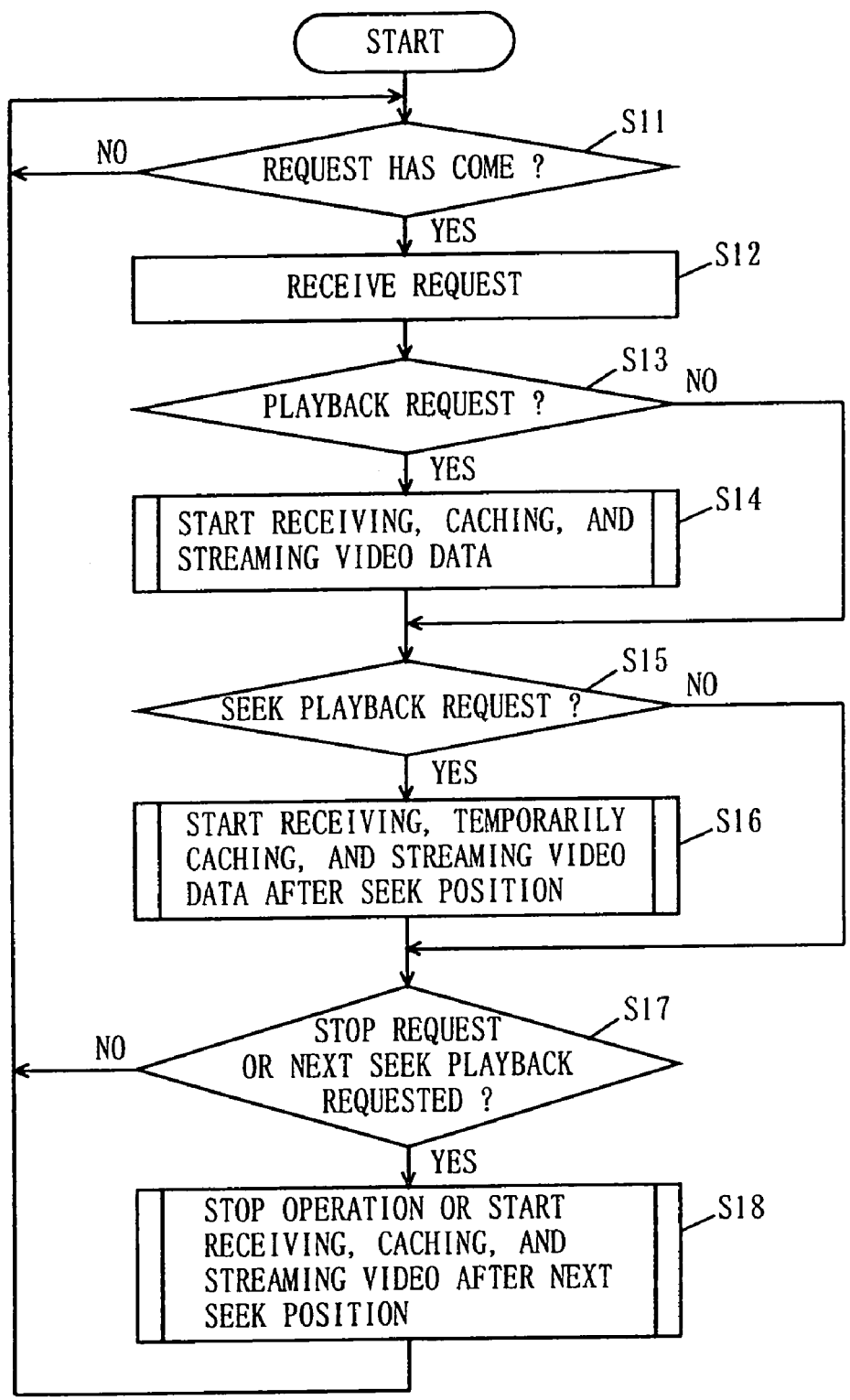
FIG. 3 is a flowchart showing the operation which is carried out by the video proxy server according to the first embodiment of the present invention for seek playback.

Described next below is the operation which is carried out by the above-constructed video proxy server 22 for seek playback. FIG. 3 is a flowchart showing the operation which is carried out by the video proxy server 22 according to the present embodiment for seek playback. As illustrated in FIG. 3, in the video proxy server 22, the request receiving section 23 first determines whether any request has come from the terminal 21 (step S11). If any request has come, the request receiving section 23 receives the request (step S12). Then, the request receiving section 23 determines whether the request is a playback request (step S13). If the request is not a playback request, the procedure goes to step S15.

If it is determined in step S13 that the request is a playback request, the operation of receiving the video data from the content server 20, caching the video data, and streaming the video data to the terminal 21 is started (step S14).

In the next step S15, it is determined whether the request received in step S12 is a seek playback request. If the request is not a seek playback request, step S17 is executed.

If it is determined in step S15 that the request is a seek playback request, the operation of receiving the video data after the seek position from the content server 20, temporarily caching the video data after the seek position, and streaming the video data after the seek position to the terminal 21 is started (step S16).

In the next step S17, it is determined whether the request received in step S12 is a stop request or a next seek playback request. If the request is neither a stop request nor a next seek playback request, the procedure returns to step S11, where the request receiving section 23 waits until another request comes from the terminal 21.

If it is determined in step S17 that the request is a stop request, the operation is stopped. If it is determined in step S17 that the request is a next seek playback request, the operation of receiving, from the content server 20, the video data from the next seek position, temporarily caching the video data from the next seek position, and streaming the video data from the next seek position to the terminal 21 is started (step S18). Thereafter, the procedure returns to step S11, where the request receiving section 23 waits until another request comes from the terminal 21.

The operation which is carried out by the video proxy server 22 for seek playback has now been described. Described next are details about the aforementioned steps S14, S16, and S18.

[Step S14]

Figure 4:
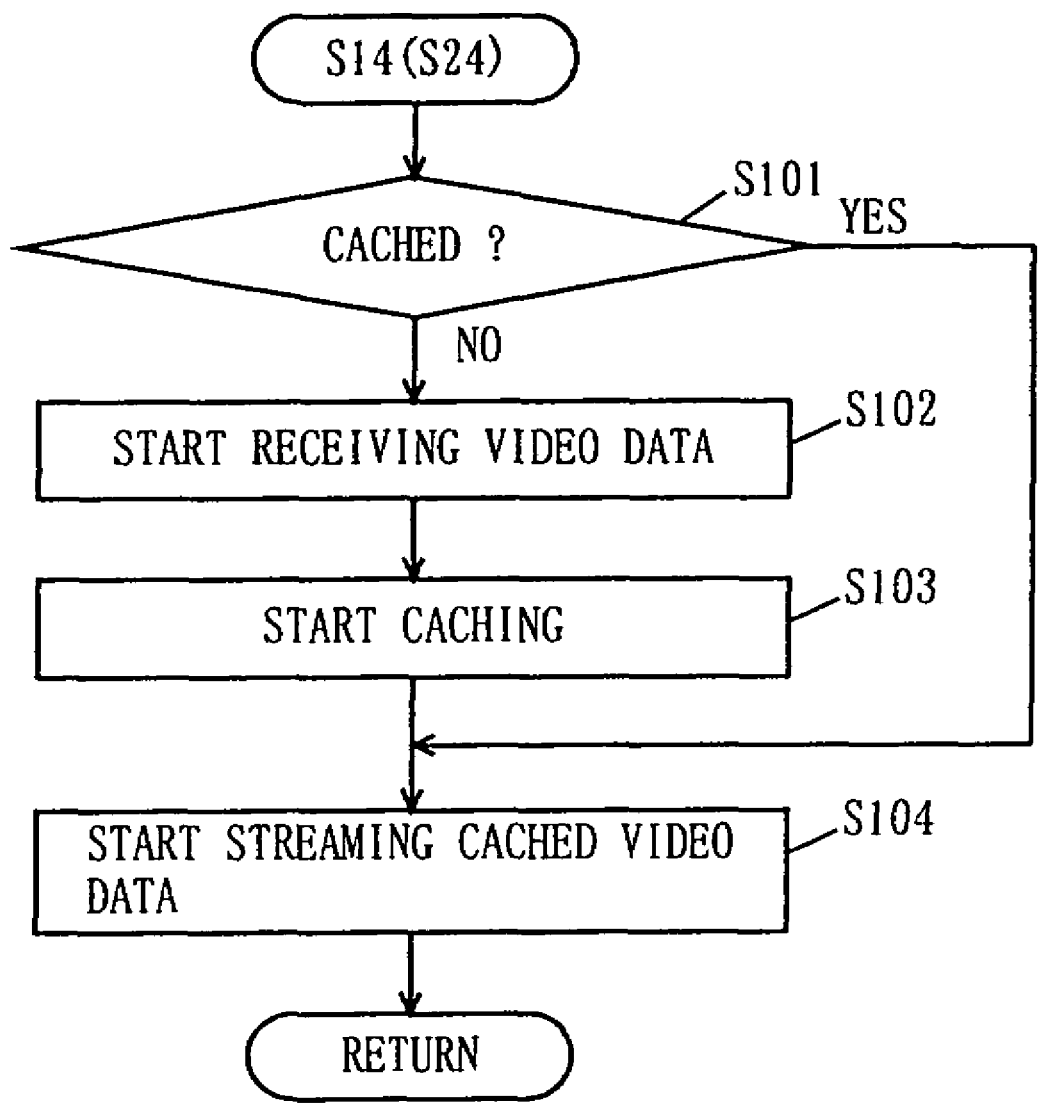
FIG. 4 is a flowchart showing step S14 of FIG. 3 (or step S24 of FIG. 10) in detail.

FIG. 4 is a flowchart showing in detail the operation in step S14 of FIG. 3 which is carried out by the video proxy server 22 for receiving video data from the content server 20, caching the video data, and streaming the video data to the terminal 21. In FIG. 4, the video receiving section 24 first determines whether the requested video data has already been cached in the video cache section 25 (step S101). If the requested video data has been cached in the video cache section 25, the procedure goes to step S104.

If it is determined in step S101 that the requested video data has not yet been cached in the video cache section 25, the video receiving section 24 starts receiving the video data from the content server 20 (step S102). Simultaneously, the video cache section 25 starts caching the video data received by the video receiving section 24 in the cache area 25*a* (step S103). On the other hand, the video streaming section 26 starts reading the video data cached in the cache area 25*a*, and streams the read video data to the terminal 21 (step S104). The procedure then returns to the flow of FIG. 3.

[Step S16]

Figure 5:
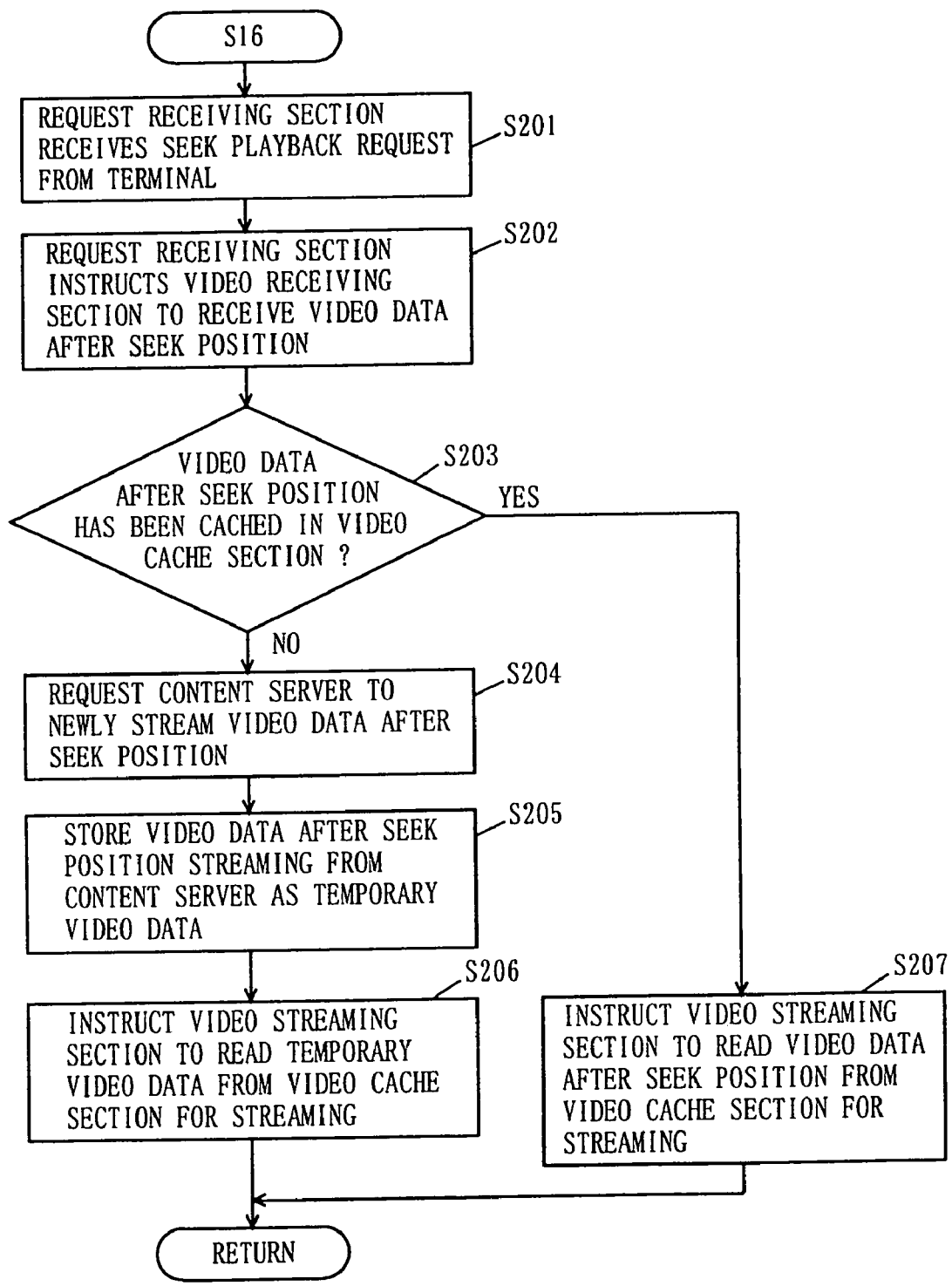
FIG. 5 is a flowchart showing step S16 of FIG. 3 in detail.
Figure 6:
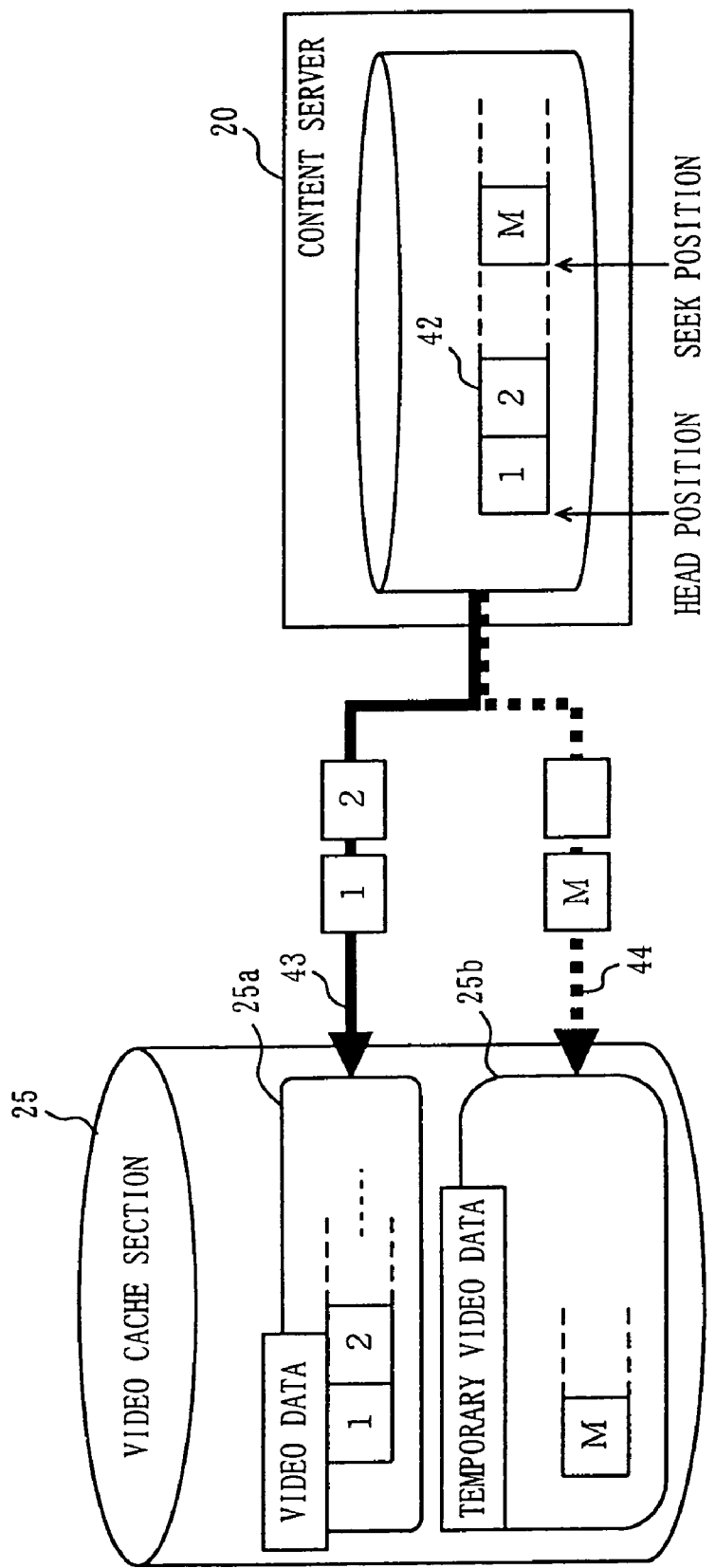
FIG. 6 is a conceptual illustration visually showing the operation of step S16 of FIG. 3.

FIG. 5 is a flowchart showing in detail the operation in step S16 of FIG. 3 which is carried out by the video proxy server 22 for receiving the video data after the seek position from the content server 20, temporarily caching the video data after the seek position, and streaming the video data after the seek position to the terminal 21. FIG. 6 is a conceptual illustration visually illustrating the operation of step S16 of FIG. 3. With reference to FIG. 5, when a seek playback request is outputted from the terminal 21, the request receiving section 23 receives the request (step S201).

Upon receiving the seek playback request, the request receiving section 23 instructs the video receiving section 24 to retrieve video data after the seek position from the content server 20 (step S202). In response, the video receiving section 24 checks whether the video data after the seek position (the seek position is specified with time, such as "60 minutes later") has been cached in the video cache section 25 (step S203).

If it is determined in step S203 that the video data after the seek position has been cached in the video cache section 25, the video receiving section 24 instructs the video streaming section 26 to start reading the cached video data after the seek position from the video cache section 25 and streaming the read video data after the seek position to the terminal 21 (step S207) The procedure then returns to the flow of FIG. 3.

If it is determined in step S203 that the video data after the seek position has not yet been cached in the video cache section 25, the video receiving section 24 carries out the following operation. That is, in FIG. 6, video data 42 successive in time ("1", "2", . . . ) is streaming from the content server 20. Here, the video receiving section 24 is receiving the video data 42 while instructing the video caching section 25 to cache the video data 42 in the cache area 25a. That is, in the cache area 25a of the video cache section 25, the video data is being cached successively from the head position, such as "1", "2", . . . (refer to a solid-line arrow 43 in FIG. 6).

In this state, if it is determined in step S203 that the video data after the seek position has not yet been cached, the content server 20 is instructed to newly stream the requested video data after the seek position "M", "M+1", . . . (step S204). In this way, the video receiving section 24 starts receiving the video data after the seek position while continuing to receive the video data 42 from the head position.

Of the video data streaming from the content server 20, the video cache section 25 stores only the newly requested video data after the seek position "M", "M+1", . . . in the temporary cache area 25b as temporary video data (step S205). That is, the video cache section 25 caches the video data after the seek position "M", "M+1", . . . in the temporary cache area 25b while continuing to cache the video data from the head position, such as "1", "2", . . . in the cache area 25a.

A flow of the video data streaming in steps S204 and S205 is conceptually denoted with a dotted arrow 44 in FIG. 6. A portion of the video data 42 after the seek position (in FIG. 6, M and thereafter) is received from the content server 20, and stored, as temporary video data, in the area (temporary cache area 25b), which is not the area for storing the video data from the head position (cache area 25a).

Then, the request receiving section 23 instructs the video streaming section 26 to read and stream the temporary video data from the video cache section 25 (step S206). The procedure then returns to the flow of FIG. 3.

[Step S18]

Figure 7:
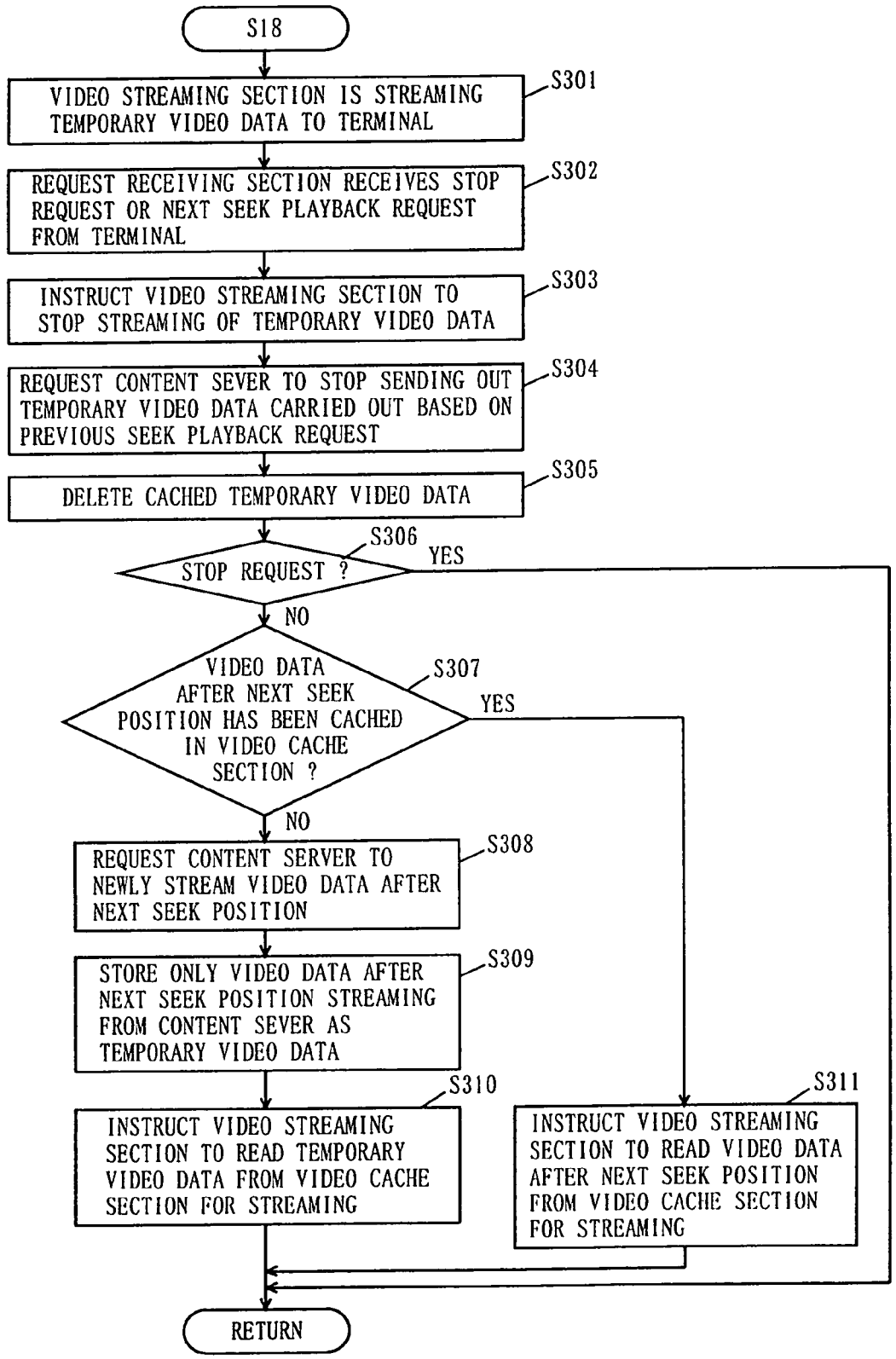
FIG. 7 is a flowchart showing step S18 of FIG. 3 in detail.
Figure 8:
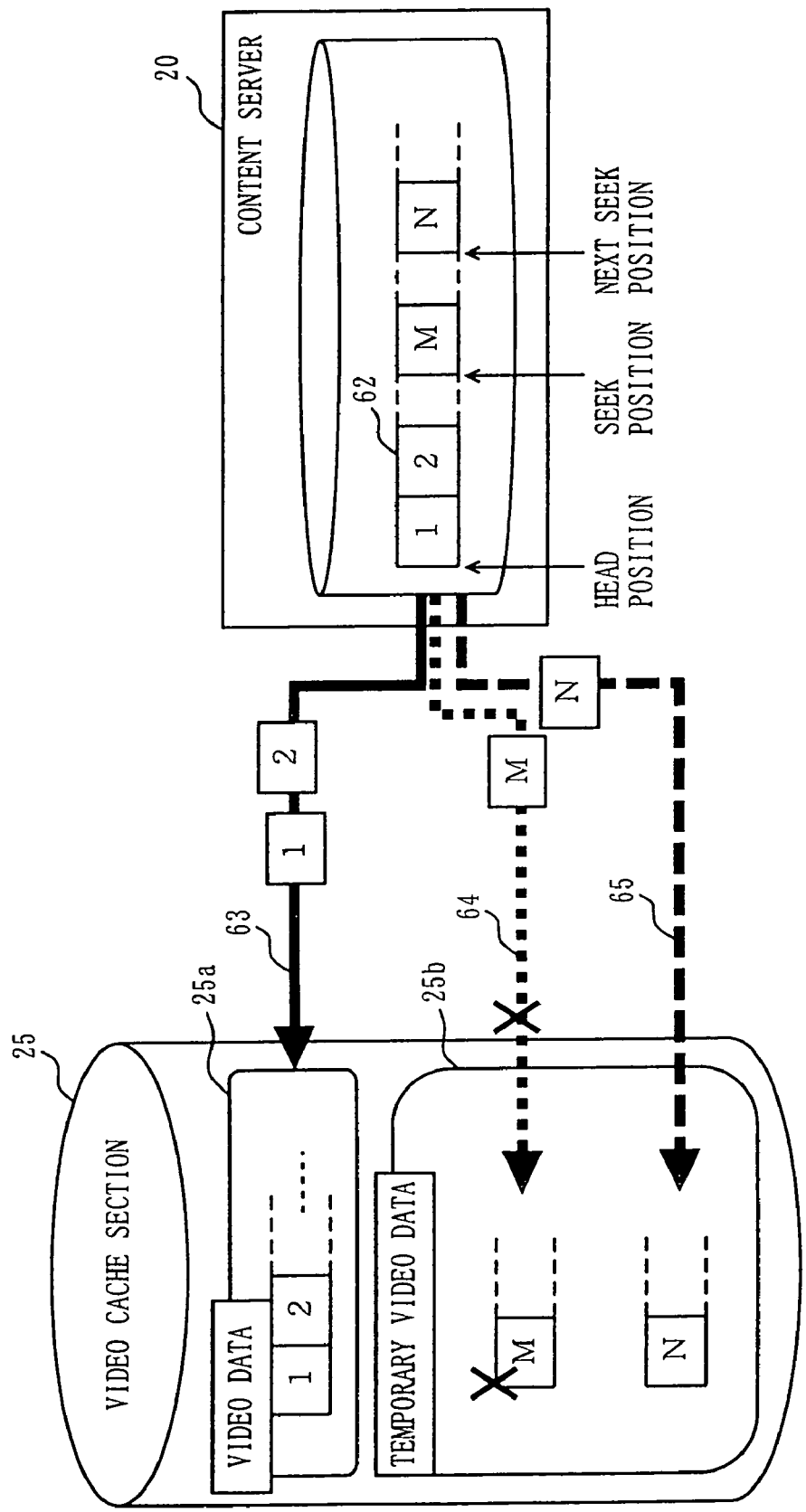
FIG. 8 is a conceptual illustration visually showing the operation of step S18 of FIG. 3.

FIG. 7 is a flowchart showing in detail the operation in step S18 of FIG. 3 which is carried out by the video proxy server 22 for receiving the video data after the next seek position from the content server 20, temporarily caching the video data after the next seek position, and streaming the video data after the next seek position to the terminal 21. FIG. 8 is a conceptual illustration visually showing the operation of step S18 of FIG. 3. With reference to FIG. 7, the video streaming section 26 is now streaming the video data after the seek position as the temporary video data in response to the seek playback request from the terminal 21 (step S301). In this state, the request receiving section 23 receives, from the terminal 21, a request for stopping video streaming (stop request) or a seek playback request for seeking another position in the video data being streamed (next seek playback request) (step S302).

Based on the stop request or the next seek playback request, the request receiving section 23 instructs the video streaming section 26 to stop streaming of the temporary video data in response to the previous seek playback request (step S303). The request receiving section 23 then instructs the video receiving section 24 to stop receiving the temporary video data. In response, the video receiving section 24 requests the content server 20 to stop sending out the temporary video data (step S304). The request receiving section 23 also instructs the video cache section 25 to delete, from the temporary cache area 25b, the temporary video data cached based on the previous seek playback request (that is, to clear the temporary cache area 25b) (step S305).

With reference to FIG. 8, the operation of the above steps S304 and S305 is described. In FIG. 8, video data 62 successive in time ("1", "2", . . . ) is being sent out from the content server 20. In the cache area 25a, the video data 62 is being cached successively from the head position, such as "1", "2", (refer to a solid-line arrow 63 in FIG. 8).

At the same time, in response to the previous seek playback request, video data after the seek position "M", "M+1", . . . is being sent out from the content server 20. In the temporary cache area 25b of the video cache section 25, the video data after the seek position "M", "M+1", . . . is being cached as the temporary video data (refer to a dotted arrow 64 in the drawing).

In this state, when a next seek playback request is issued from the terminal 21, the operation of receiving the temporary video data "M", "M+1", . . . being executed by the video receiving section 24 in response to the previous seek playback request (that is, the operation of sending out the temporary video data "M", "M+1", . . . being executed by the content server 20; refer to the dotted arrow 64 in FIG. 8) is stopped. Then, the temporary video data "M", "M+1", . . . being stored in the temporary cache area 25b of the video cache section 25 is deleted (that is, the temporary cache area 25b is cleared).

Then, the operation of receiving temporary video data "N", "N+1", . . . in response to the next seek playback request is newly started. The temporary video data "N", "N+1", . . . is being newly stored in the cleared temporary cache area 25b (refer to a dotted arrow 65 in the drawing).

Referring back to FIG. 7, described below is the procedure that is subsequent to step S305. If the request received in step S302 by the request receiving section 23 is a stop request, the procedure returns to the flow of FIG. 3.

Furthermore, the request receiving section 23 determines whether the video data after the next seek position has been cached in the video cache section 25 (step S307). If the video data after the next seek position has been cached in the video cache section 25, the request receiving section 23 instructs the video streaming section 26 to read the video data after the next seek position from the video data already cached in the video cache section 25 and start streaming the cached video data after the next seek position to the terminal 21 (step S311) The procedure then returns to the flow of FIG. 3.

If the request received in step S302 by the request receiving section 23 is not a stop request but a next seek playback request and it is determined in step S307 that the video data after the next seek position has not yet been cached in the video cache section 25, the video receiving section 24 requests the content server 20 to newly stream the video data after the next seek position (step S308). The video cache section 25 then stores, of the video data sent out from the content server 20, only the data sent out in response to the request made in step S308 in the temporary cache area 25b as temporary video data (step S309).

A flow of the video data streaming in the above steps S308 and S309 is conceptually denoted with a dotted arrow 65 in FIG. 8. A portion of the video data 62 after the next seek position (in FIG. 8, N and thereafter) is received from the content server 20, and stored, as temporary video data, in the area (temporary cache area 25b), which is not the area for storing the video data 62 from the head position (cache area 25a).

Finally, the request receiving section 23 instructs the video streaming section 26 to read the temporary video data from the temporary cache area 25b of the video cache section 25 and stream the temporary video data to the terminal 21 (step S310) The procedure then returns to the flow of FIG. 3.

As such, according to the present embodiment, when the terminal 21 does a seek during video playback, the operation of receiving and caching the video data, and the operation of receiving video data after the seek position, temporarily caching the video data after the seek position, and streaming the video data after the seek position to the terminal 21 are concurrently carried out. Therefore, it is possible to quickly respond to the request from the terminal for streaming the video data after the seek position, and it is also possible to cache the video data without any loss.

Second Embodiment

Figure 9:
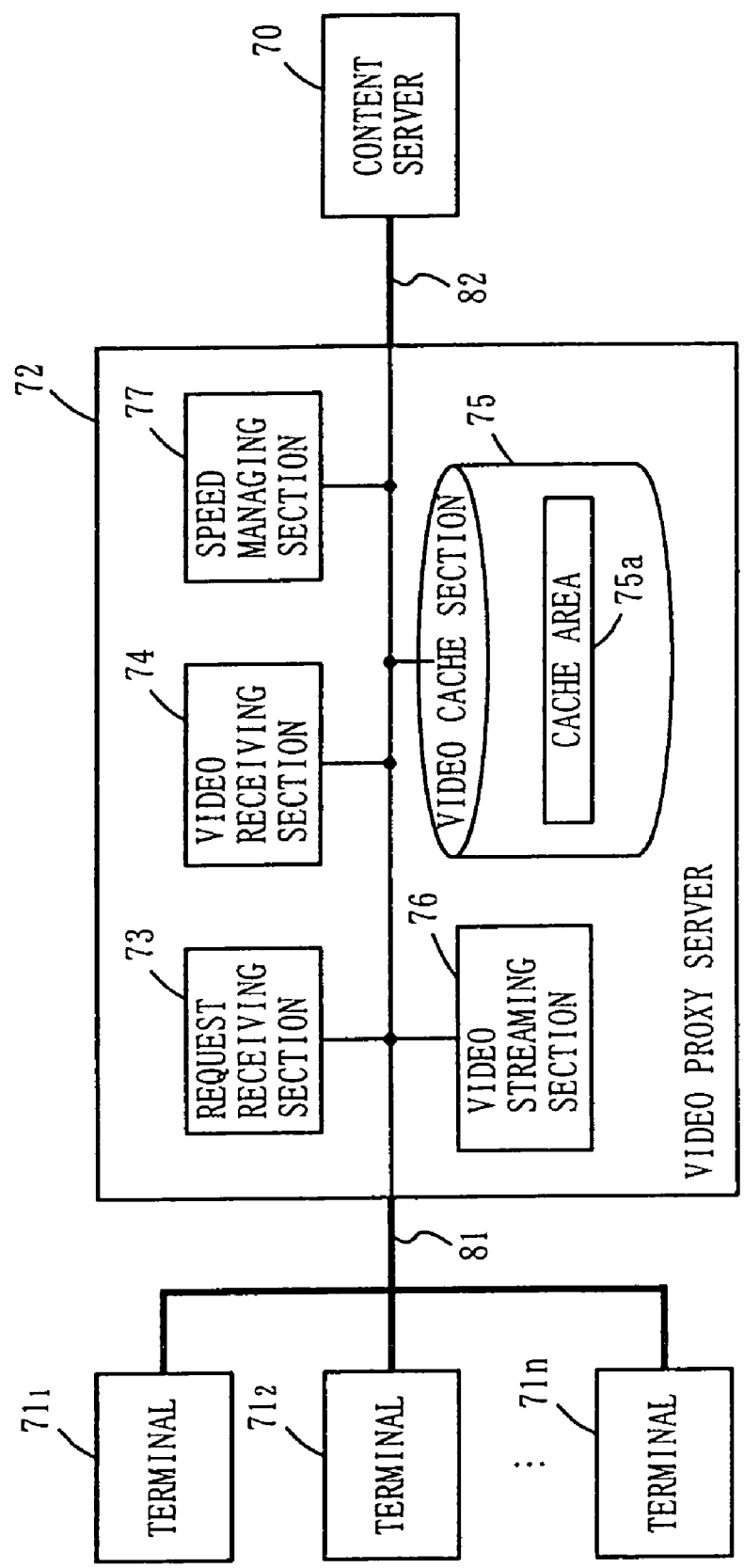
FIG. 9 is a block diagram showing the configuration of a video streaming system using a video proxy server according to a second embodiment of the present invention.

FIG. 9 is a block diagram illustrating the configuration of a video streaming system using a video proxy server according to a second embodiment of the present invention. In FIG. 9, the video streaming system includes a content server 70, terminals $71_1$ to $71_k$ (where k is an arbitrary integer not less than 2), and a video proxy server 72 according to the present embodiment. The terminals $71_1$ to $71_k$ are connected to the video proxy server 72 via a network 81. The video proxy server 72 is connected to the content server 70 via a network 82. Note that, in the following description, the terminals $71_1$ to $71_k$ are collectively denoted as "terminals 71" if they do not have to be distinguished from each other.

The content server 70 stores video data. Each terminal 71 reproduces video data streaming thereto. The video proxy server 72 is placed between the content server 70 and the terminals 71, receives video data from the content server 70, caches the video data, and streams the video data to the terminals 71.

The video proxy server 72 includes a request receiving section 73, a video receiving section 74, a video cache section 75, a video streaming section 76, and a speed managing section 77.

The request receiving section 73 receives a request from any of the terminals 71. The video receiving section 74 receives video data from the content server 70. The video cache section 75 caches the video data received by the video receiving section 74. The video streaming section 76 streams the video data cached by the video cache section 75 to the terminals 71.

Here, the video data stored in the content server 70 is digital video data, as in the first embodiment. The content server 70 has a function of sending out video data as a stream in response to a request from any of the terminals 71. The video data sent out from the content server 70 is streaming via the networks 81 and 82 to the requesting terminal 71, which reproduces the streaming video data on a real-time basis.

Each terminal 71 can carry out two types of playback. One is normal playback of reproducing video data at a constant speed. The other is high-speed playback (N-fold speed playback) of reproducing video data at a speed higher than the constant speed. For normal playback, the terminal 71 issues a playback request, and the content server 70 sends out video data at a speed (constant speed) corresponding to the constant playback speed of the terminal 71 for normal playback. For high-speed playback, the terminal 71 issues a speed-change request, and the content server 70 sends out video data at a speed (high speed) corresponding to the playback speed of the terminal 71 for high-speed playback. To stop playback, the terminal 71 issues a stop request, and the content server 70 stops sending out the video data.

The speed managing section 77 manages the playback speeds of the terminals 71. That is, the speed managing section 77 includes a storage area for storing the playback speeds of the terminals 71. For example, based on the speed-change request from any of the terminals 71, the speed managing section 77 updates the stored playback speed, thereby managing the current playback speeds of the terminals 71.

The video cache section 75 includes a cache area 75a for caching the video data received by the video receiving section 74 from the content server 70.

The video receiving section 74 receives the requested video data from the video cache section 75 if the requested video data is cached, or otherwise from the content server 70.

That is, when the request receiving section 73 receives a playback request, the video receiving section 74 determines whether the requested video data has been cached in the video cache section 75. If the requested video data has not yet been cached in the video cache section 75, the video receiving section 74 starts receiving the video data from the content server 70.

The video streaming section 76 streams the video data cached by the video cache section 75 to the terminal 71 at a speed corresponding to each playback speed.

The video receiving section 74 receives video data from the content server 70 at a speed Vmax corresponding to a speed that is the highest of the playback speeds of the terminals 71 managed by the speed managing section 77. This makes it possible to stream video data to each terminal 71 at a speed corresponding to each playback speed.

Furthermore, when the request receiving section 73 receives a speed-change request for changing the speed Vmax, at which the video receiving section 74 is receiving video data, to another speed V, the video receiving section 74 compares the speed V with the speed Vmax. If V>Vmax, the video receiving section 74 changes the operation to retrieve video data from the content server 70 at the speed V. If V<Vmax, on the other hand, the video receiving section 74 continues receiving video data from the content server 70 at the speed Vmax.

That is, if any of the terminals 71 has changed the playback speed to the speed V, the speed V is compared with the maximum speed Vmax before change. If V>Vmax, the speed of video reception from the content server 70 is changed from Vmax to V. On the other hand, if V<Vmax, the speed of video reception is maintained at Vmax. This makes it possible to stream video data at a speed corresponding to the playback speed of each terminal 71 even with any speed change at any terminal 71.

Also, when the request receiving section 73 receives a stop request while the video receiving section 74 is receiving video data from the content server 70 at the speed Vmax, the video receiving section 74 changes the operation to retrieve video data from the content server 70 at a speed V'max corresponding to a speed that is the highest of the playback speeds, managed by the speed managing section 77, of the terminals 71 for except the terminal that issued the stop request. That is, the video receiving section 74 compares the speed V'max with a predetermined speed Vdef. If V'max>Vdef, the video receiving section 74 changes the speed of video reception from the content server 70 from Vmax to V'max.

In other words, if one of the terminals 71 that operates at the highest speed is stopped, the speed of video reception from the content server 70 is changed to the speed V'max corresponding to the speed of the terminal that operates at the second highest speed. If any terminal 71 other than the one that operates at the highest speed is stopped, the speed is maintained at the speed Vmax. Thus, it is possible to stream video data at a speed corresponding to the playback speed of each of the remaining terminals 71 irrespective of which terminal is stopped.

As such, the playback speeds of the terminals 71 are managed, and video data is received from the content server 70 at the speed corresponding to the highest speed of the playback speeds of the terminals 71. Therefore, video data can be streaming at the speed corresponding to the playback speed of each terminal 71.

When the speed V'max is lower than the predetermined speed Vdef, however, the video receiving section 74 receives video data from the content server 70 not at the speed V'max but at the speed Vdef. That is, if V'max<Vdef, the video receiving section 74 changes the speed of video reception from the content server 70 from Vmax to Vdef. Thus, even if the playback speed of any of the terminals 71 becomes extremely low, the speed of video reception from the content server 70 is maintained at the speed Vdef or higher for caching. Therefore, it is possible to respond to a sudden seek at any of the terminals 71.

An example hardware structure of the video proxy server according to the present embodiment is similar to that according to the first embodiment, which is illustrated in FIG. 2. The operations of the components according to the present embodiment are also similar to those according to the first embodiment. However, the program stored in the ROM 34 is different from that according to the first embodiment, thereby achieving the above-described operations of the components (73 to 77) of the video streaming system of the second embodiment. Note that the program may be provided as being stored in a portable recording medium such as CD-ROM, or may be supplied via a network.

Figure 10:
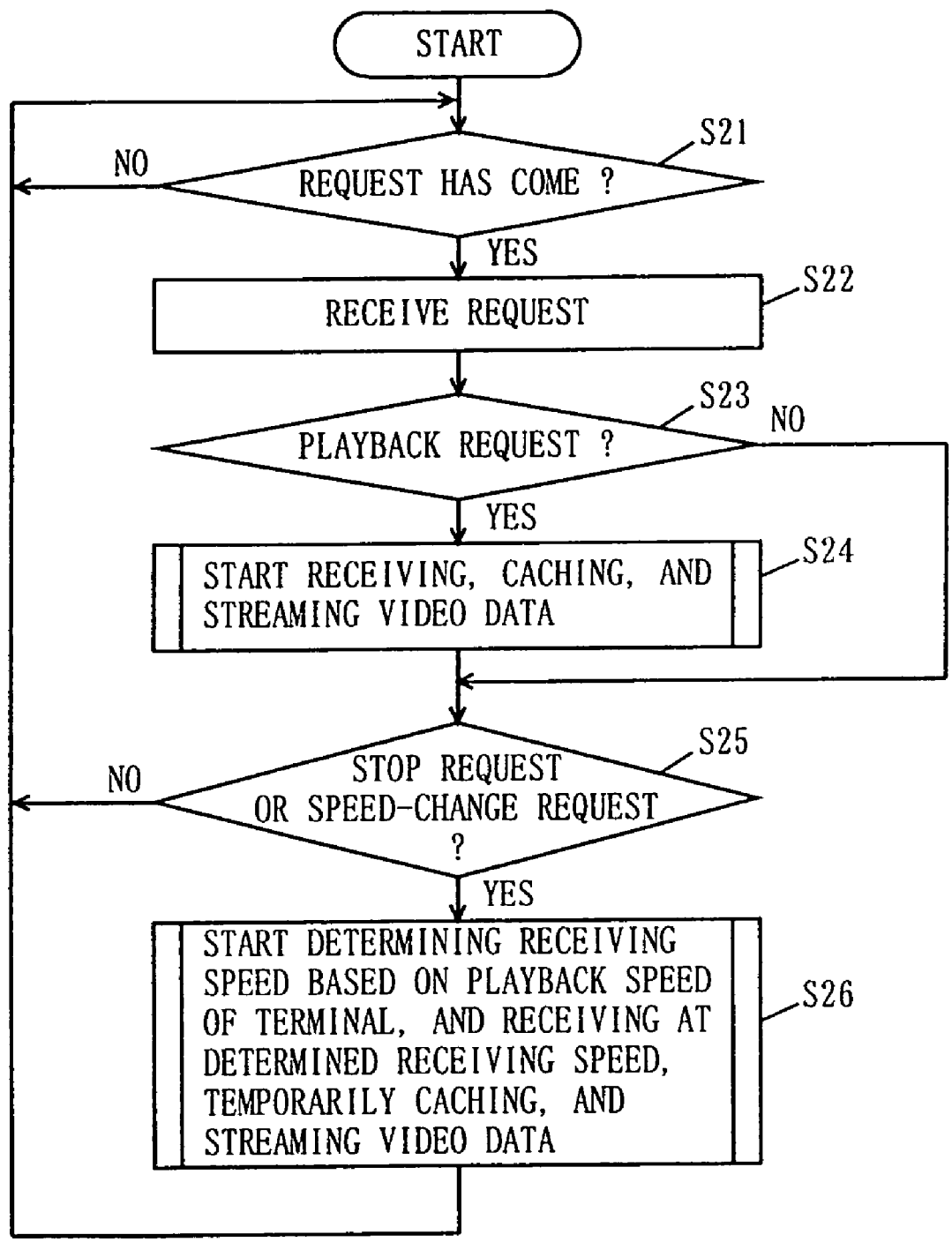
FIG. 10 is a flowchart showing the operation which is carried out by the video proxy server according to the second embodiment of the present invention for speed change.

Described below is the operation which is carried out by the above-structured video proxy server 72 for changing the playback speed. FIG. 10 is a flowchart showing the operation which is carried out by the video proxy server 72 according to the present embodiment for changing the playback speed. As shown in FIG. 10, in the video proxy server 72, the request receiving section 73 first determines whether a request has come from any of the terminals 71 (step S21), and receives the request, if any (step S22). Then, the request receiving section 73 determines whether the request is a playback request (step S23). If the request is not a playback request, the procedure goes to step S25.

If the request is a playback request, the video proxy server 72 starts receiving video data from the content server 70, caching the video data, and streaming the video data to the terminal 71 (step S24).

In the next step S25, it is determined whether the request received in step S22 is a stop request or a speed-change request. If the received request is neither a stop request nor a speed-change request, the procedure returns to step S21, where the request receiving section 73 waits until another request comes from any of the terminal 71.

If the received request is a stop request or a speed-change request, the receiving speed is determined based on the playback speeds of the terminals 71. At the determined receiving speed, video data is received from the content server 70, temporarily cached, and streamed to each terminal 71 at the speed corresponding to each playback speed (step S26). The procedure then returns to step S21, where the request receiving section 73 waits until another request comes from any of the terminal 71.

The operation which is carried out by the video proxy server 72 for changing the speed has now been described. Described next are details about the aforementioned steps S24 and S26.

[Step S24]

The operation in step S24 of FIG. 10 which is carried out by the video proxy server 22 for receiving video data from the content server 70, caching the video data, and streaming the video data to the requesting terminal 71 is similar to step S14 of FIG. 3 in the first embodiment, and its details are shown in FIG. 4. However, video data to be streamed to the terminal 71 is hereinafter denoted as "M0", and a speed at which the video receiving section 74 receives the video data M0 from the content server 70 in step S102 of FIG. 4 is hereinafter denoted as "V0", which is the maximum speed Vmax before speed change.

[Step S26]

Figure 11:
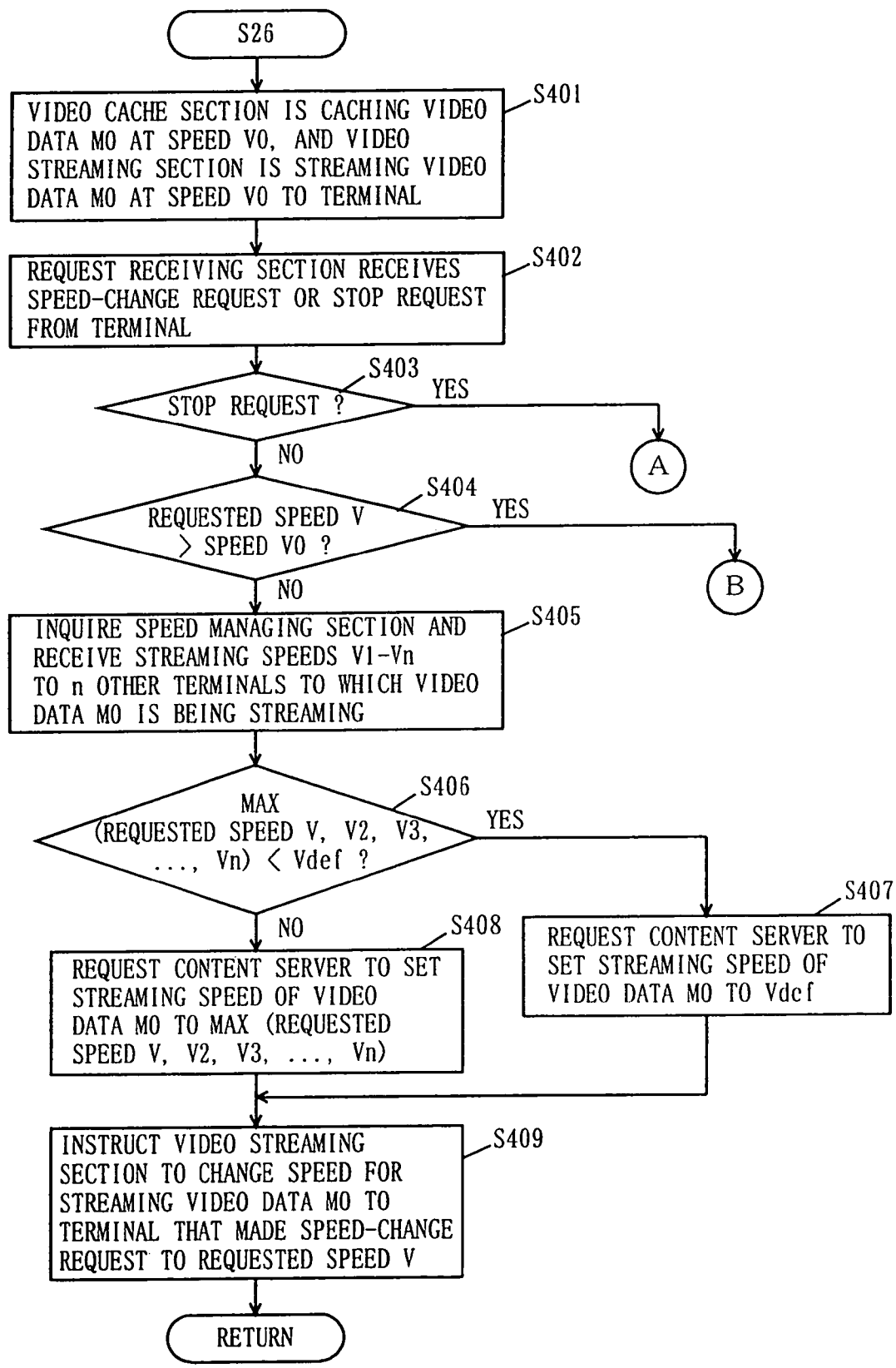
FIG. 11 is a flowchart showing step S26 of FIG. 10 in detail.
Figure 12:
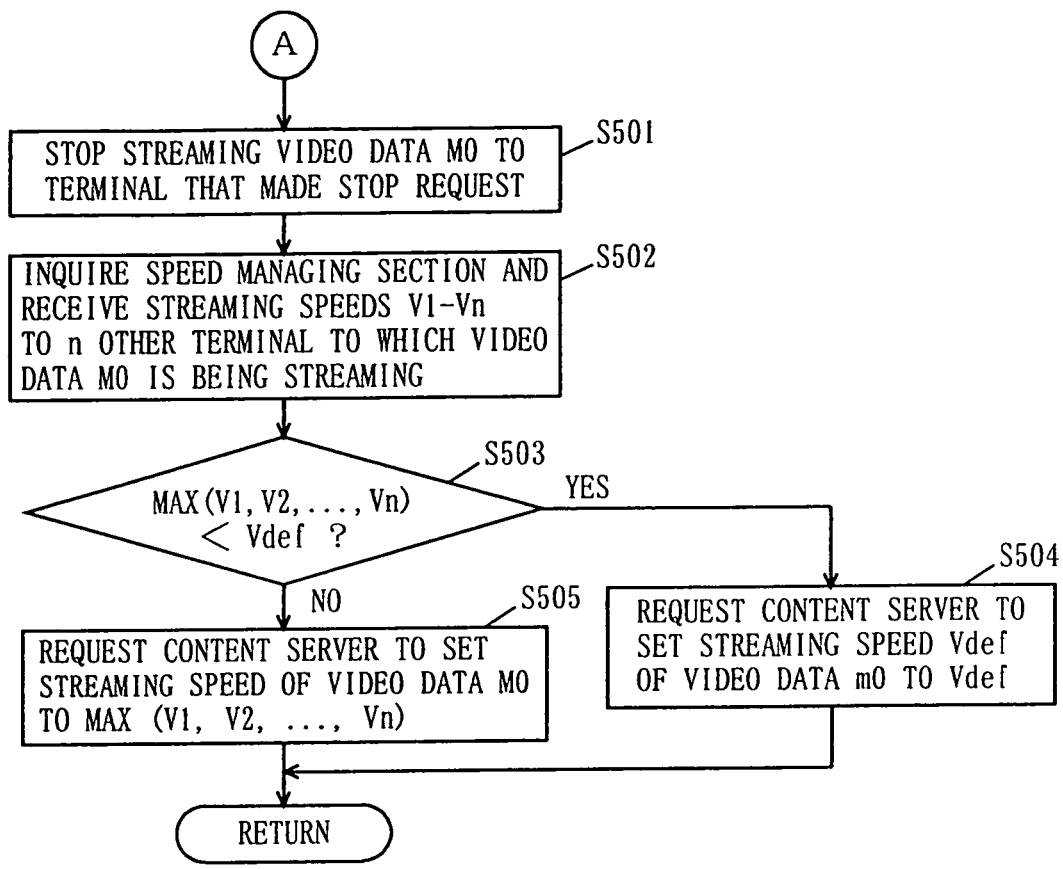
FIG. 12 is a flowchart showing a process denoted as "A" in FIG. 11 of step S26 of FIG. 10 in detail.
Figure 13:
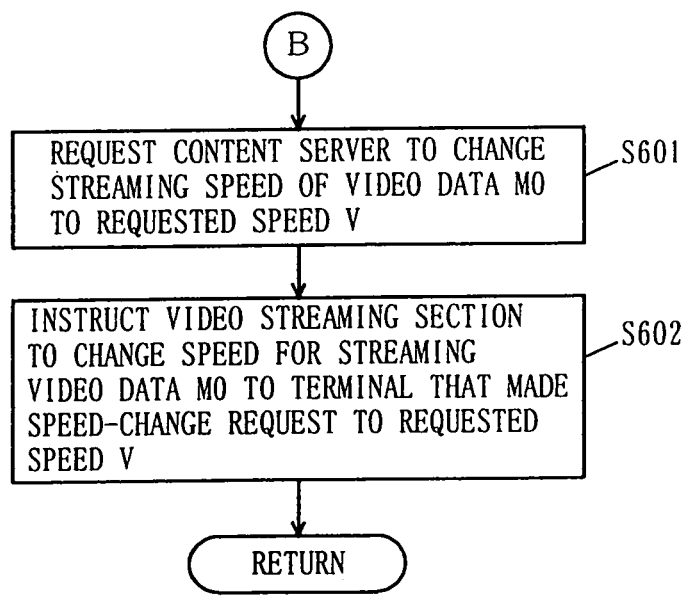
FIG. 13 is a flowchart showing a process denoted as "B" in FIG. 11 of step S26 of FIG. 10 in detail.
Figure 14:
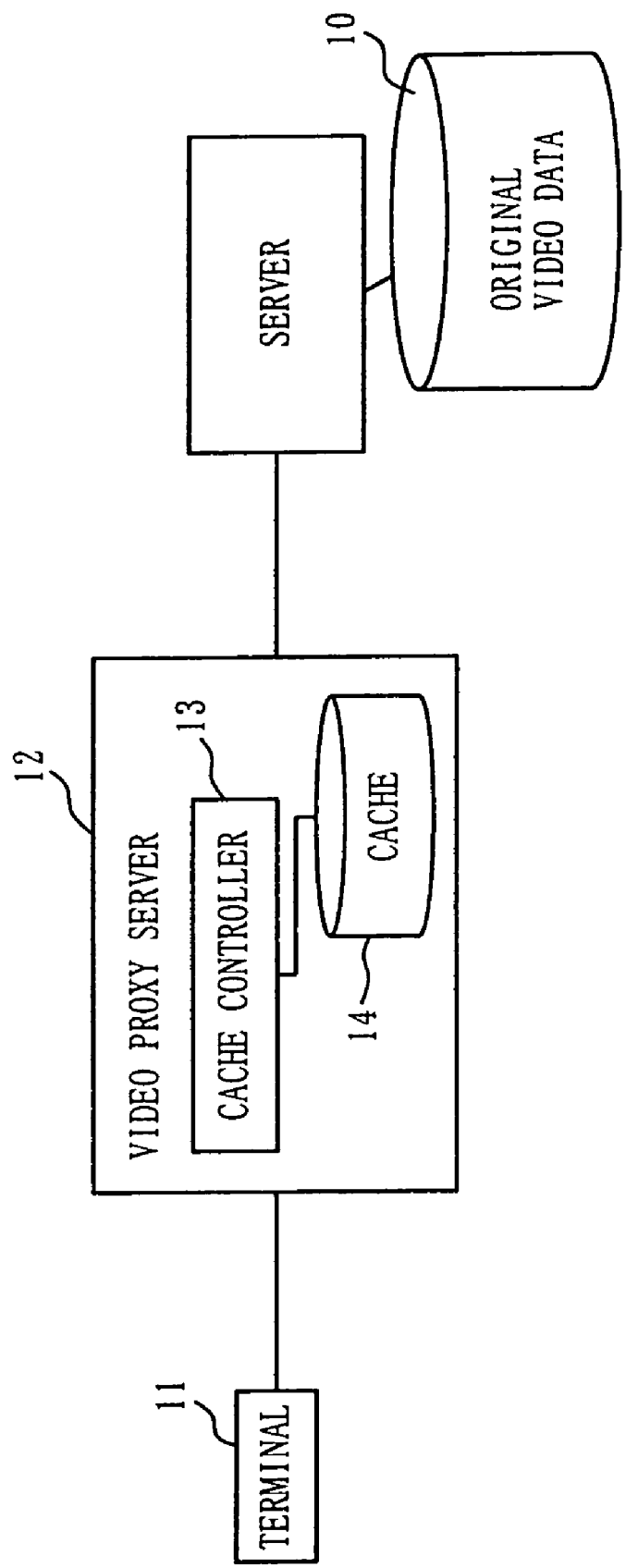
FIG. 14 is a block diagram showing an example configuration of a streaming system using a conventional video proxy server.

FIGS. 11 to 13 show flowcharts showing details of operations which are carried out by the video proxy server 72 for determining the receiving speed based on the playback speeds of the terminals 71, receiving video data at the determined speed, temporarily caching the video data, and streaming the video data to each terminal 71 at the speed corresponding to each playback speed. With reference to FIG. 11, the video cache section 75 is now caching the video data at a speed V0, and the video streaming section 76 is now streaming the video data at the speed V0 (step S401). In this state, any one of the terminals 71 stops playback or changes a playback speed, and the request receiving section 73 receives a request for stopping video streaming (stop request) or a request for changing a video streaming speed (speed-change request) (step S402).

Then, it is determined whether the request received in step S402 by the request receiving section 73 is a stop request (step S403). If the received request is a stop request, an operation denoted as "A" is executed, which is illustrated in FIG. 12.

In FIG. 12, when the request receiving section 73 receives a stop request, the video streaming section 76 stops streaming of the video data M0 to the terminal 71 that made the stop request (step S501). The video streaming section 76 then inquires the speed managing section 77 of the playback speeds of the terminals 71 to which the video data M0 is streaming. That is, assuming that the video data M0 is currently streaming to n terminals 71 (n is an arbitrary integer not less than 1 and not more than (k−1)), streaming speeds V1 to Vn of these terminals 71 are received (step S502). Then, the highest speed of the speeds V1 to Vn (the speed is hereinafter denoted as MAX(V1, V2, . . . , Vn)) is compared with the predetermined speed Vdef (step S503)

If the speed Vdef is higher in step S503, the content server 70 is requested to change the streaming speed of the video data M0 to MAX(V1, V2, . . . , Vn) (step S505). The procedure then returns to the flow of FIG. 10.

Referring back to FIG. 11, if it is determined in step S403 that the received request is not a stop request, the request from the terminal 71 is a speed-change request, and it is determined whether a requested speed V is higher than the original speed V0 (step S404). If the requested speed V is higher than the original speed V0, an operation denoted as "B" is executed, which is shown in FIG. 13.

In FIG. 13, the video receiving section 74 requests the content server 70 to change the streaming speed of the video data M0 to the speed V requested by the terminal 71 (step S601). The video streaming section 76 changes the streaming speed of the video data M0 to the terminal 71 that made the speed-change request to the requested speed V (step S602). The procedure then returns to the flow of FIG. 10.

Referring back to FIG. 11, if the speed V requested by the terminal 71 is lower than the streaming speed V0 of the video data M0 from the content server 70, the video streaming section 76 inquires the speed managing section 77 of the playback speeds of the terminals 71 to which the video data M0 is streaming. That is, the streaming speeds V1 to Vn to n other terminals to which the video data M0 is streaming are received from the speed managing section 77 (step S405). Then the maximum speed MAX(V, V1, V2, ..., Vn) of the speeds V and V1 to Vn is compared with the predetermined speed Vdef (step S406).

If the speed Vdef is higher in step S406, the content server 70 is requested to change the streaming speed of the video data M0 to the speed Vdef (step S407). The procedure then goes to step S409.

On the other hand, if MAX(V, V1, V2, ..., Vn) is higher than Vdef, the content server 70 is requested to change the streaming speed of the video data M0 to MAX (V, V1, V2, ..., Vn) (step S408). The procedure then goes to step S409.

In the next step S409, the video streaming section 76 is instructed to change the streaming speed of the video data M0 to the terminal that issued the speed-change request to the requested speed V. The procedure then returns to the flow of FIG. 10.

As such, according to the present embodiment, the playback speeds of the terminals 71 are managed so that video data is received from the content server 70, cached, and streamed to the terminals 71 at a speed corresponding to a speed that is the highest of all playback speeds of the terminals 71. Therefore, video data can be streaming at the speed corresponding to the playback speed of each terminal 71.

While the invention has been described in detail, the foregoing description is in all aspects illustrative and not restrictive. It is understood that numerous other modifications and variations can be devised without departing from the scope of the invention.

What is claimed is:

1. A video proxy server, provided between a content server storing video data and a plurality of terminals capable of video playback at playback speeds differed from each other, for receiving the video data from the content server, caching the video data, and streaming the video data to the terminals for playback, the video proxy server comprising:
   a request receiving section for receiving a request from each of the terminals;
   a speed managing section for storing and managing the playback speeds of each of the terminals from which the request receiving section is currently receiving the request;
   a video receiving section for receiving the video data from the content server at a speed Vmax corresponding to a speed that is a highest of the playback speeds of the terminals stored by the speed managing section;
   a video cache section for caching the video data received by the video receiving section; and
   a video streaming section for streaming the video data cached by the video cache section to the terminals at the playback speeds of the terminals stored by the managing section.

2. The video proxy server according to claim 1, wherein when the request receiving section receives a speed-change request for changing the speed Vmax at which the video data is being received from the content server to a speed V, the video receiving section compares the speed V with the speed Vmax and, when the speed V>the speed Vmax, moves to an operation of receiving the video data from the content server at the speed V, and when the speed V≦the speed Vmax, continues an operation of receiving the video data from the content server at the speed Vmax.

3. The video proxy server according to claim 1, wherein when the request receiving section receives a stop request while the video receiving section is receiving the video data from the content server at the speed Vmax, the video receiving section moves to an operation of receiving the video data from the content server at a speed V'max corresponding to a speed that is a highest of the playback speeds, managed by the speed managing section, of the terminals except the terminal that made the stop request.

4. The video proxy server according to claim 1, wherein when the request receiving section receives a stop request while the video receiving section is receiving the video data from the content server at the speed Vmax, the video receiving section compares a speed V'max corresponding to a speed that is a highest of the playback speeds, managed by the speed managing section, of the terminals except the terminal that made the stop request with a predetermined speed Vdef, and when the speed V'max>the speed Vdef, the video receiving section moves to an operation of receiving the video data from the content server at the speed V'max, and when the speed V'max≦the speed Vdef, moves to an operation of receiving the video data from the content server at the speed Vdef.

5. A video streaming method carried out between a content server storing video data and a plurality of terminals capable of video playback at playback speeds differed from each other, for receiving the video data from the content server, caching the video data, and streaming the video data to the terminals for playback, the video streaming method comprising:
   receiving a request from each of the terminals;
   storing and managing the playback speeds of each of the terminals from which the request is being currently received;
   receiving the video data from the content server at a speed Vmax corresponding to a speed that is a highest of the stored playback speeds of the terminals;
   caching the received video data; and
   streaming the cached video data to the terminals at the stored playback speeds of the terminals.

6. A computer-readable recording medium having a program recorded thereon, the program for executing a video streaming method carried out between a content server storing video data and a plurality of terminals capable of video playback at playback speeds differed from each other, for receiving the video data stored in the content server, caching the video data, and streaming the video data to the terminals for playback, the video streaming method comprising:
   receiving a request from each of the terminals;
   storing and managing the playback speeds of each of the terminals from which the request is currently being received;
   receiving the video data from the content server at a speed Vmax corresponding to a speed that is a highest of the stored playback speeds of the terminals;
   caching the received video data; and
   streaming the cached video data to the terminals at the stored playback speeds of the terminals.

* * * * *